Aug. 11, 1942.   F. M. THOMAS   2,292,589
VARIABLE PITCH PROPELLER
Filed March 31, 1939
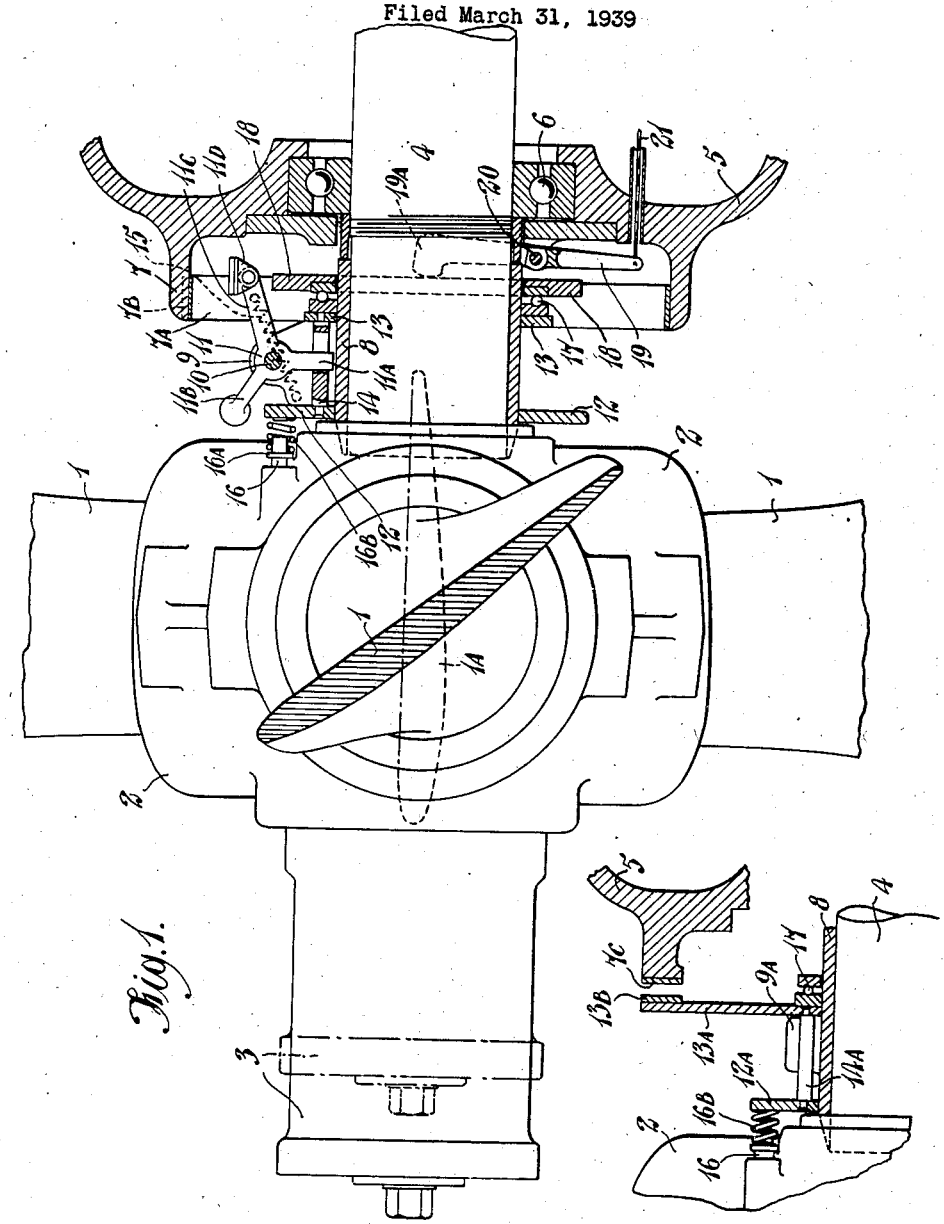
INVENTOR
F. M. Thomas,
BY Charles S. Reynolds
ATTORNEY Patented Aug. 11, 1942

2,292,589

UNITED STATES PATENT OFFICE 2,292,589

VARIABLE PITCH PROPELLER

Frederick Metcalf Thomas, Hatfield, England, assignor to The De Havilland Aircraft Company Limited, Hatfield Aerodrome, England Application March 31, 1939, Serial No. 265,377
In Great Britain April 6, 1938

21 Claims. (Cl. 170—135.6)

This invention relates to variable pitch propellers, and especially airscrews of the kind in which very high or infinite pitch can be reached by the blades. This is often called "feathering"; in this specification feathering means putting a blade into a pitch position of minimum forward drag, or wherein fluid-flow in the direction of the axis of rotation produces no torque in the propeller, or a pitch position approximating to either or both of these conditions, the chord of the airscrew blades being generally aligned with the path of travel of the vehicle, when thus feathered. The invention relates to propellers which can be feathered during rotation.

An object is to enable a propeller, especially an airscrew, to be braked quickly when feathered in case of engine failure, so as to prevent damage to the engine.

Another object of the present invention is to provide a variable pitch and feathering propeller with means whereby braking or arresting of rotation may occur automatically with the operation of feathering.

A further object is to provide an airscrew and a brake in such a way that the operation of changing pitch to or towards feathered condition involves the application of means for arresting rotation of the airscrew.

A further object is to provide an airscrew which can be feathered as to pitch, with means for braking or holding it against rotation, in such circumstances that release of the airscrew for further rotation is a matter of control; and still further, that such release may result in the airscrew having its pitch decreased.

A further object is to provide a feathering airscrew with means to lock it against rotation about the airscrew shaft when feathered, in a predetermined position relative to the aircraft structure, in order, for example, to minimise aerodynamic interference, or for other reasons.

It is, in general, desirable in aircraft, that in the event of engine failure of some kinds, the engine (for example one engine of a multi-engined craft) may be stopped. It may also be desirable to stop an engine and re-start it. Some variable pitch airscrews derive power for pitch changing from the operation of the engine, for example, where pitch-change is effected by hydraulic pressure, derived from one or more pumps which only work when the engine is turning. Such a pump is shown as element 142 in U. S. Patent No. 2,174,717 issued to Caldwell et al. on October 3, 1939. If, where such an airscrew is feathered by fluid under pressure supplied by a pump of this type, it be required to re-start, it is of course found that there is no engine power available for driving the pump to effect the required pitch change. The invention may permit starting by preventing engine rotation with the blades set so that there is some slight positive aerodynamic torque available (though with practically minimum drag), and by affording control means to again release the propeller so that it will whirl to crank the engine by that torque.

For the purpose of clarity, bodily rotation of the whole propeller about the engine shaft will be referred to as whirling of the propeller to distinguish such operation from pitch-changing rotation of the blades about their several individual axes, and where the context permits, "brake" and "braking" are terms used to include "lock" and "locking," and where differentiation is called for, these will be distinguished by reference to "friction brake" or "positive lock" respectively; alternatively, the term "stop means" may be employed in the generic sense to include either friction braking or positive locking.

The accompanying diagrammatic drawing shows a general arrangement incorporating the invention, and a variant:

Figure 1 is a partly sectional side elevation of a three-blade feathering airscrew mechanism;

Figure 2 is a scrap-view showing detail alternative to part of Figure 1.

In Figure 1, the airscrew itself is shown as having blades 1 mounted in a hub 2, from the front (or side remote from the engine) of which extends an axially disposed sliding cylinder 3, operatively connected by known mechanism for altering the position of the blades, the position of which corresponding to feathering of the blades is shown in dotted lines. A blade is indicated at 1A in feathered pitch. The airscrew is carried on and whirls about an engine shaft 4 extending from within a fixed mounting for engine casing 5 in which the shaft 4 is borne by a bearing 6. Between the hub 2 and casing 5, and mounted around shaft 4, is shown braking mechanism. The casing 5 is forwardly extended to form a fixed brake drum 7 with internally-facing brake surface at 7A. Upon and rotatable with the shaft 4 is rigidly mounted a sleeve 8, which has three pairs of radially projecting bracket lugs 9 formed on it, and each pair of these lugs supports, on a bearing 10, a three-armed lever 11 of which one arm, 11A, extends inwards towards shaft 4, one, 11B, extends forwardly, and the third, 11C, extends rearwardly. Arm 11B carries a balance mass; arm 11C carries, pivotally, a brake shoe 11D to bear against the surface 7A. Mounted around the sleeve 8 to slide axially thereon, are two annular rings 12, 13, rigidly interconnected by axially directed rods or bails 14. The rods 14 lie between each pair of lugs 9, so the assembly of rings and rods 12, 13, 14 is not rotatable relative to sleeve 8. The rods 14 are longitudinally slotted to receive the tails of the lever arms 11A. A snap-spring 15 forms a resilient anchor between the lever 11 and lugs 9, so arranged that the tension-line of the spring lies normally (brake off) to one side of the axis of bearing of lever 11, snapping over "dead centre" when the lever 11 is slightly moved anti-clockwise for application of the brake. Clearance between arm 11A and the rod-slot engaged thereby, permits the lever 11 to pivot until the brake engages, once the spring 15 crosses dead centre.

The ring 12 has small locating-projections to locate compression springs 16B which act axially between ring 12 and collars 16A on rods 16. The rods 16 are connected, within the hub 2, to the cylinder 3 for axial movement therewith; the rods 16 are, of course, borne for sliding in the hub 2. Normally the ends of the rods 16 are well spaced from the ring 12.

To bear axially against the ring 13 is a thrust bearing 17, to transmit thrust from a non-rotating but axially slidable collar 18 encircling the shaft 4. A forked lever 19 is pivoted at 20 to the casing 5 in such a way that it straddles the shaft 4 and, when a cable or equivalent control 21 is pulled, the fork ends 19A push on the collar 18 and thus on the assembly 12, 13, 14, against the springs 16B.

The operation is, briefly, as follows: Suppose the user operates the pitch-control for feathering, e. g. because of engine failure—or such action occurs automatically—the cylinder 3 moves to the right and blades 1 turn towards feathering. Meanwhile the rods 16 move to the right and the springs 16B, with no substantial resistance, push the assembly 12, 13, 14, to the right along sleeves. This sleeve and lugs 9 fixed thereon do not slide axially, or to the right along shaft 4 when the assembly 12, 13, 14 is thus moved. At a predetermined movement, beyond that degree of pitch change used in normal flight, the lever 11 has been sufficiently rotated by the engagement of arm 11A with rod 14 for the spring 15 to snap over dead-centre and to thus apply the brake. The airscrew is now fully feathered, preferably to a position of slight positive torque but very little drag. The brake stops whirling of the airscrew and engine. Now assume a restart is required. The user pulls cable 21, and thus compresses the springs 16B in moving the assembly 12, 13, 14, to the left. The opposite end of the slot in rod 14 now engages the arm 11A, takes the brake off, and the airscrew starts to whirl by virtue of the slight torque available. By its rotation the engine may be cranked so that power becomes available to decrease the pitch. If, however, the pitch is too great to afford starting torque, further tension on cable 21 may compress the springs 16B until the rods 16 abut against the ring 12, so that the cylinder 3 may be positively thrust forward whereby the blades 1 are moved to a less pitch. The arrangement thus provides auxiliary manual control for changing pitch away from feathered condition.

The arms 11B and their masses may be such as to balance out the centrifugal force in the lever 11, or so overbalance that the application of the brake is restrained by centrifugal force if the whirling R. P. M. of the airscrew be too high. The rods 16 and springs 16B may have lost-motion so as to be quite idle and inoperative unless the pitch is somewhere near feathered and outside normal range for flying.

As a minor variant, the brake shoe 11D may be formed as a dog adapted to engage a recess indicated at 7B for positive locking of the airscrew instead of friction braking. This dog may be arranged in a predetermined angular position. In that case it would be undesirable for the operation of locking to occur at any substantial whirling speed, and the masses of the arms 11B are made so great as to inhibit locking except at very low speed, the springs 16B being made appropriately light.

Another variant, not requiring illustration, is to omit the spring 15 altogether and to make the slot of the rod 14 a closer fit for the arm 11A. Then, the brake-pressure is derived directly from the pitch changing mechanism, being exerted from cylinder 3 through the springs 16B. In such case, the operation of releasing the brake is that leftward movement of the assembly 12, 13, 14 directly pushes off the brake against the springs 16B. Alternatively the brake may be released by applying power to change blade-pitch away from feathering.

Figure 2 illustrates a major variant in which the brake is axially-operating instead of internally-expanding type. Only sufficient details are shown to fit this view into the arrangement of Figure 1. The casing 5 presents a brake surface 7C axially, to co-operate with an annular brake shoe 13B mounted on a ring 13A which, with ring 12A and rods 14A, forms an assembly exactly equivalent to 12, 13, 14, of Figure 1. The ring 12A is again thrust by springs 16B from rods 16 as before. The rods 14A are received between and guided for movement axially along sleeve 8 by pairs of lugs 9A integral with sleeve 8, which sleeve is fixed upon shaft 4. The operation is, that, when the blades 1 are feathered and cylinder 3 moves to the right, the rods 16 and springs 16B urge the assembly 12A, 13A, 14A, to the right and apply the shoe 13B against the surface 7C frictionally. Release of the brake is accomplished by mechanism like that shown in Figure 1 operating in the manner described above.

The airscrew and brake gear may be of the known kind in which pitch-change in both senses is dependent on turning of the engine, and in which the power for pitch-change is derived from the engine such as in U. S. Patent 2,174,717 mentioned above, when the auxiliary, independently driven pump 156 is eliminated. The control 21 may be independently operated, manually or automatically, or it may be interconnected with other controls.

What I claim is:

1. In a variable pitch airscrew, axially movable means for feathering the blades, stop means to resist rotation of the airscrew, means movable axially with said feathering means to render said stop means operative, and means for resiliently interconnecting the said two axially movable means.

2. A variable pitch airscrew adapted to be feathered, feathering means comprising an axially movable element rotating with the airscrew, radially operating stop means rotating with said airscrew and adapted to resist rotation of the airscrew, fixed complementary stop means to cooperate with said rotating stop means, and means for operatively interconnecting said element with said rotating stop means.

3. An airscrew according to claim 2, in which said rotating stop means are pivotally mounted.

4. An airscrew according to claim 2, in which said rotating stop means are pivotally mounted and are influenced by spring means with a dead-centre snap action towards off and on positions.

5. An airscrew according to claim 2, in which said rotating stop means are pivotally mounted and are movable radially by arm and slot or equivalent connections with an axially movable assembly.

6. An airscrew according to claim 2, with control means to urge said rotating and fixed stop means out of cooperative engagement.

7. A variable pitch airscrew adapted to be feathered, feathering means comprising an axially movable element rotating with the airscrew, an axially operating stop member rotating with said airscrew, a fixed complementary stop member, and means for effecting axial movement of said rotating stop member into stopping engagement with said fixed stop member by movement of said element axially.

8. An airscrew according to claim 7, wherein the last mentioned means includes a resilient connection between said element and said rotating stop member.

9. An airscrew according to claim 7, with control means to urge said rotating and fixed stop members out of engagement.

10. The combination of a variable pitch feathering airscrew, an engine for whirling the airscrew, engine-operated means for varying the pitch of said airscrew from normal pitch to feathered position and vice versa, means for controlling said first means to vary the pitch of the airscrew, means for frictionally braking said airscrew against whirling, and means for applying said braking means by movement of the airscrew into feathered position from the pitch-range for normal flight conditions.

11. Combination according to claim 10, wherein means are provided for releasing the braking means while the airscrew remains feathered and the engine is stopped.

12. The combination of a variable pitch airscrew adapted to feather and rotatable with respect to a fixed mounting, an engine for whirling said airscrew, power means to vary the airscrew pitch dependent on turning of said engine, a member moving in response to change in pitch of the airscrew, stop means engageable between the airscrew and the fixed mounting and operable to resist whirling of said airscrew and engine, and means actuated by movement of said member to a position corresponding to feathered position of the airscrew for effecting engagement of said stop means to resist such whirling.

13. Combination according to claim 12, in which in feathered position the airscrew is subject to positive aerodynamic torque and substantially minimum axial drag, and means operable to release the stop means sufficiently for its aerodynamic torque to effect rotation of the airscrew.

14. Combination according to claim 10, and a weighted member holding the braking means in released position when moved radially outward by the centrifugal force of its rotation for normal flight conditions.

15. Combination according to claim 10, wherein the last mentioned means includes a member moving in accordance with variations in pitch of the airscrew, and further comprising means for releasing said braking means while the airscrew remains feathered and the engine is stopped, and said releasing means also being operable to move said member for reducing the airscrew pitch from such feathered position while the engine is stopped.

16. The combination of a feathering variable pitch airscrew rotatable with respect to a fixed mounting, means operable to feather said airscrew, stop means reacting from such fixed mounting and operable to resist whirling of said airscrew with respect to such mounting, and means automatically operated upon movement of said airscrew to feathering position for actuating said stop means.

17. Combination according to claim 16, and manually actuated control means operable by initial movement to release the stop means unaccompanied by shifting of the airscrew from feathered position, and by additional movement operable to actuate the feathering means to reduce the airscrew pitch from such feathered position.

18. The combination of a feathering variable pitch airscrew, means operable to feather said airscrew in position wherein it creates slight positive torque, stop means operable to resist whirling by such torque of the airscrew thus feathered, and means for actuating said stop means automatically operated upon movement of said airscrew to such feathering position.

19. Combination according to claim 18, and manually actuated control means operable to release the stop means unaccompanied by shifting of the airscrew from feathered position, for whirling of the airscrew thereafter by the slight positive torque created in such feathered position.

20. The combination of a variable pitch feathering airscrew, means operable to vary the airscrew pitch from normal pitch to feathered position, stop means automatically operated upon movement of said airscrew to such feathered position to resist whirling of the airscrew, and manually actuated means operable independently of said pitch varying means, when the airscrew is in feathered position, to release said stop means for whirling of the airscrew.

21. A variable pitch airscrew adapted to be feathered, comprising means operable to effect movement of the airscrew to feathered position, stop means operable to resist whirling of the airscrew while in feathered position, including a non-rotative member, and a member rotatable with the airscrew and adapted for holding engagement with said non-rotative member, engaging means operable upon movement of said airscrew into feathered position to effect holding engagement of said two members, and a safety control member for said stop means, independent of the airscrew but rotatable in conjunction therewith, moved outward by its own centrifugal force of rotation to override said engaging means and to hold said rotatable member in released position, out of engagement with said non-rotative member, during whirling of the airscrew at a speed greater than a predetermined maximum, stop means engaging speed.

FREDERICK M. THOMAS.